(12) United States Patent
Rabe et al.

(10) Patent No.: US 10,719,186 B1
(45) Date of Patent: Jul. 21, 2020

(54) MANAGING DATA STORAGE

(75) Inventors: Bruce R. Rabe, Dedham, MA (US); Scott E. Joyce, Foxboro, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 740 days.

(21) Appl. No.: 13/435,397

(22) Filed: Mar. 30, 2012

(51) Int. Cl.
*G06F 3/0481* (2013.01)

(52) U.S. Cl.
CPC ................................. *G06F 3/0481* (2013.01)

(58) Field of Classification Search
CPC ...................................................... G06F 3/0481
USPC ............................................................. 715/712
See application file for complete search history.

(56) References Cited

U.S. PATENT DOCUMENTS

| | | | |
|---|---|---|---|
| 7,194,538 B1* | 3/2007 | Rabe et al. | 709/224 |
| 7,293,237 B1* | 11/2007 | Knight | G06F 3/0605 711/170 |
| 7,698,351 B1* | 4/2010 | Hing et al. | 707/827 |
| 2005/0138174 A1* | 6/2005 | Groves et al. | 709/226 |
| 2008/0250317 A1* | 10/2008 | Evans | G06F 3/0481 715/712 |
| 2011/0067025 A1* | 3/2011 | Cragun et al. | 718/100 |
| 2012/0303923 A1* | 11/2012 | Behera | G06F 9/455 711/170 |

\* cited by examiner

*Primary Examiner* — Tadesse Hailu
*Assistant Examiner* — Darrin Hope
(74) *Attorney, Agent, or Firm* — Krishnendu Gupta; Nikhil Patel

(57) ABSTRACT

There is disclosed a method and system for use in managing data storage. A plurality of discrete management operations is recorded in connection with a data storage system. A management operation is received in connection with the data storage system. The plurality of discrete management operations is analyzed in connection with the data storage system. Based on the analysis, a sequence of management operations performed on a predetermined number of occasions in connection with the data storage system is identified. The received management operation is one of the management operations in the sequence. A graphical user interface wizard is generated such that a user can be guided through at least a portion of the sequence of discrete management operations in response to identifying the sequence.

12 Claims, 6 Drawing Sheets

MANAGING DATA STORAGE

TECHNICAL FIELD

The invention relates to managing data storage.

BACKGROUND OF THE INVENTION

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

It will be appreciated from the foregoing that these systems can be complex. One of the results of the complexity is that a management operation performed with respect to a system can also be difficult and time-consuming. There is therefore a need to address this issue.

SUMMARY OF THE INVENTION

There is disclosed a method and system for use in managing data storage. A plurality of discrete management operations is recorded in connection with a data storage system. A management operation is received in connection with the data storage system. The plurality of discrete management operations is analyzed in connection with the data storage system. Based on the analysis, a sequence of management operations performed on a predetermined number of occasions in connection with the data storage system is identified. The received management operation is one of the management operations in the sequence. A graphical user interface wizard is generated such that a user can be guided through at least a portion of the sequence of discrete management operations in response to identifying the sequence.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION

The invention can be implemented in numerous ways, including as a process, an apparatus, a system, a computer program embodied on a computer readable storage medium, and/or a processor, such as a processor configured to execute instructions stored on and/or provided by a memory coupled to the processor. In this specification, the implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Disclosed herein is a technique for use in managing data storage. The technique comprises capturing and analyzing user actions and sequences in a data storage system. The technique can create wizards for multi-step workflows that are frequently performed in the data storage system. For example, if a user performs a sequence of steps at least twice in the last week then a wizard can be created. The sequence of steps can be the creation of a LUN, the creation of a storage group and the addition of the LUN to the storage group. If this sequence of steps is performed, for example, at least twice in the last week the technique can create a multi-step wizard that combines at least a portion of these steps.

Conventionally, hard coded wizards and dialogs were created which were general purpose and did not meet the needs of every user. The new technique as disclosed herein can customize wizards and workflow based on customer patterns.

Figure 1:
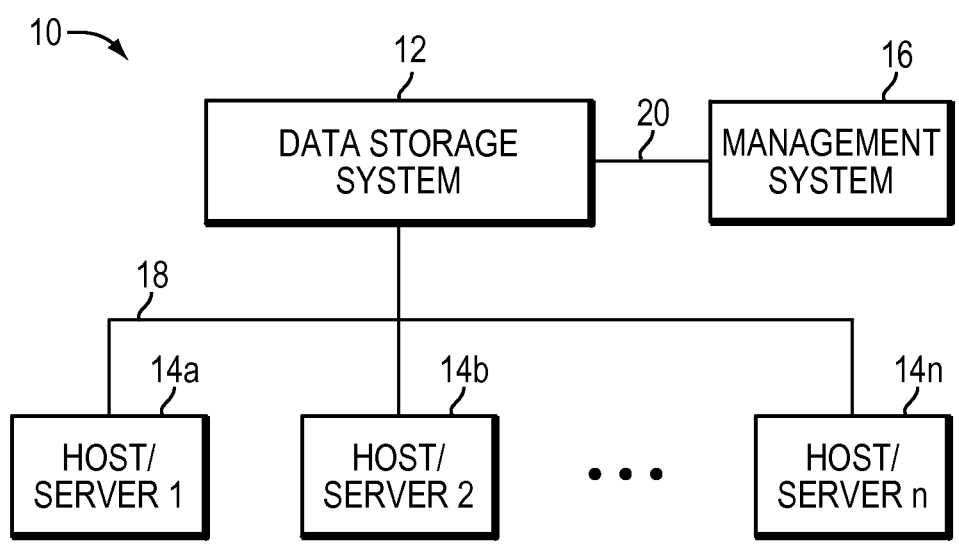
FIG. 1 is an example of an embodiment of a system that may utilize the technique described herein.

Referring to FIG. 1, there is illustrated an example of an embodiment of a computer system that may be used in connection with performing the techniques described herein. The computer system 10 includes one or more data storage systems 12 connected to server or host systems 14a-14n through communication medium 18. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 20 may be a LAN connection and the communication medium 18 may be an iSCSI or fibre channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the one or more data storage systems 12 of FIG. 1 may be an appliance with hardware and software for hosting the data storage of the one or more applications executing on the hosts 14a-14n. The appliance may include one or more storage processors and one or more devices upon which data is stored. The appliance may include software used in connection with storing the data of the hosts on the appliance and also software used in connection with configuring and provisioning the data storage for use by the hosts. As an example that may executed on the hosts 14a-14n, the data storage configuration and provisioning tasks may include allocating storage for user accounts or mailboxes, specifying the devices (logical and/or physical) used to store the email data, specifying whether data replication is performed for disaster recovery, configuring the physical devices in one or more RAID groups and other logical entities, and the like. Techniques that may be used in connection with performing data storage configuration, and configuration and provisioning tasks are described in more detail in following paragraphs.

In connection with an embodiment in which the data storage 12 is an appliance including hardware and software, the appliance may also include other software for performing different data services. For example, the appliance may include backup server software which interacts with software on the hosts 14a-14n when performing a backup operation.

In another embodiment, the data storage systems 12 may include one or more data storage systems such as one or more of the data storage systems offered by EMC Corporation of Hopkinton, Mass. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein.

Servers or host systems, such as 14*a*-14*n*, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes. Data storage devices may also be configured using other logical device layers on top of the LV or LUN which are then exposed to the host or other component using the configured data storage.

In following paragraphs, reference may be made to a particular embodiment such as, for example, an embodiment in which element 12 of FIG. 1 is an appliance as described above. However, it will be appreciated by those skilled in the art that this is for purposes of illustration and should not be construed as a limitation of the techniques herein.

Figure 2:
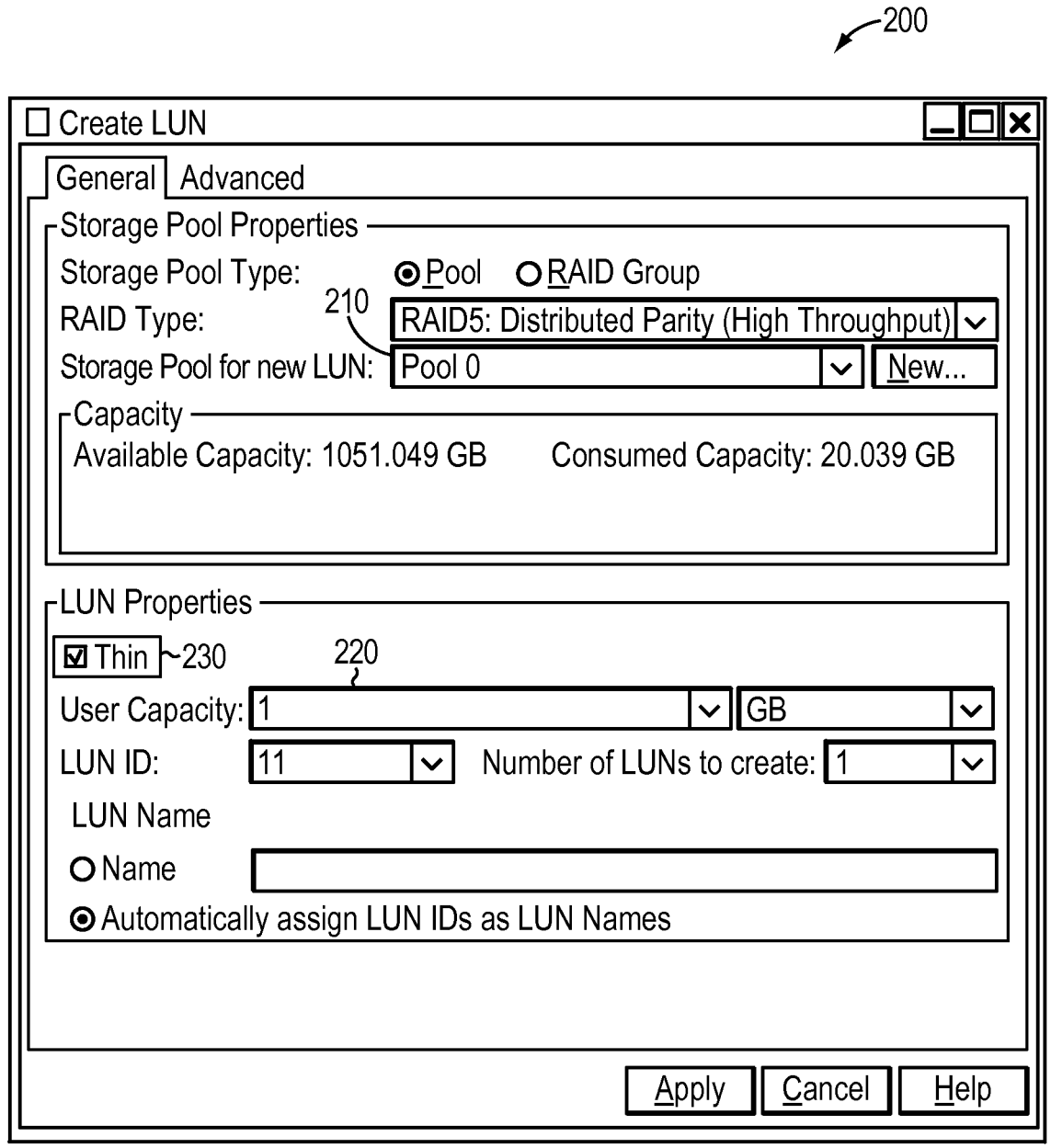
FIGS. 2 to 4 are examples illustrating discrete user interfaces for configuring data storage in a data storage system.

Referring to FIG. 2, there is illustrated a user interface 200 for performing a discrete management operation in connection with a data storage system 12. It will be appreciated that the discrete management operation relates to the creation of a LUN. It will also be appreciated from the foregoing that such a discrete management operation can be performed by the management system 16. The creation of the LUN may require the user to input characteristics for the new LUN such as selecting a storage pool 210 for the new LUN. In this embodiment, the user selects 'Pool 0' such that the new LUN will be associated therewith. The user may also input a further characteristic such as the storage capacity 220 required for the LUN. For example, in this embodiment the user inputs storage capacity of 1 GB. The user can also input a still further characteristic relating to thin provisioning requirements 230 in connection with the LUN. In this embodiment, the user positively selects the thin provisioning requirement. It will be appreciated that the LUN ID as illustrated in the figure will be automatically assigned as the new LUN name. In this embodiment, the LUN ID is 'LUN 11'. It will be further appreciated that 'LUN 11' will be created by pressing the 'Apply' button at the foot of the figure.

Figure 3:
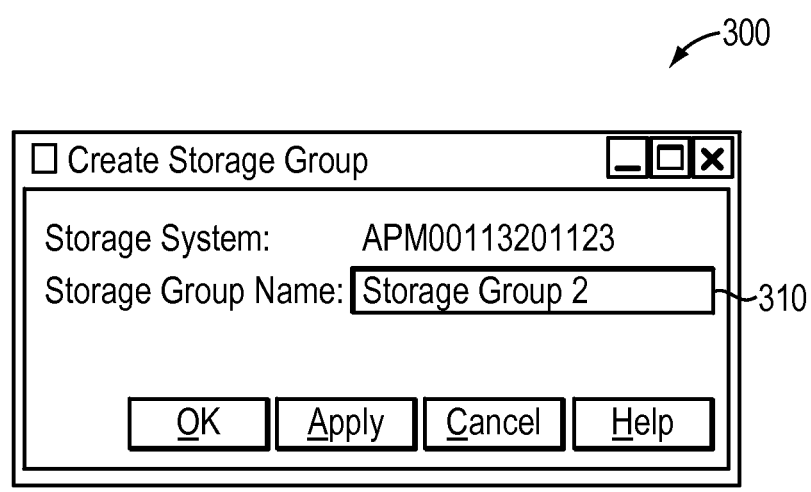

Referring to FIG. 3, there is illustrated another user interface 300 for performing a discrete management operation in connection with a data storage system 12. It will be appreciated that the discrete management operation relates to the creation of a storage group. It will be further appreciated that the management operation can also be performed by the management system 16. The creation of the storage group may require the user to input characteristics for the new storage group such as the user inputting a name of the storage group. In this embodiment, the user inputs the name 310 'Storage Group 2' as the name of the new storage group. It will be appreciated that the new 'Storage Group 2' can be created by pressing the 'Apply' button.

Figure 4:
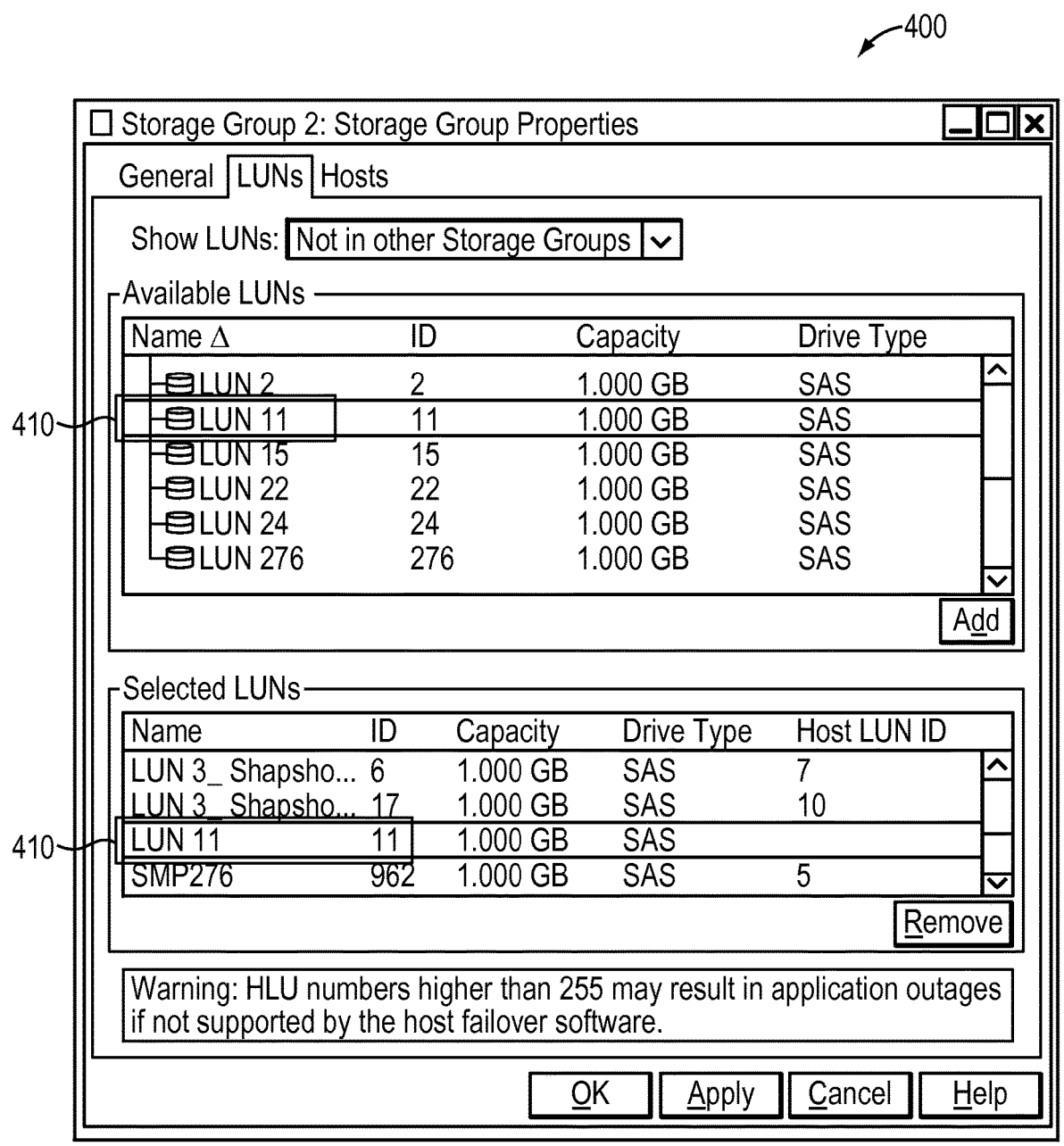

Referring to FIG. 4, there is illustrated a further user interface 400 for performing a discrete management operation in connection with a data storage system. It will be appreciated that the discrete management operation relates to the addition of a LUN to a storage group. For example, the LUN created in FIG. 2 can in a discrete step be added to the storage group created in FIG. 3. It will also be appreciated that the management operation can be performed by the management system 16. The addition of LUN to the storage group requires the user to input identification 410 of the LUN which is to be added to the storage group. In this embodiment, the user identifies the newly created LUN named 'LUN11' as created in FIG. 2. It will be appreciated that the 'LUN 11' will be added to the 'Storage Group 2' as created in FIG. 3 by pressing the 'Apply' button.

Figure 5:
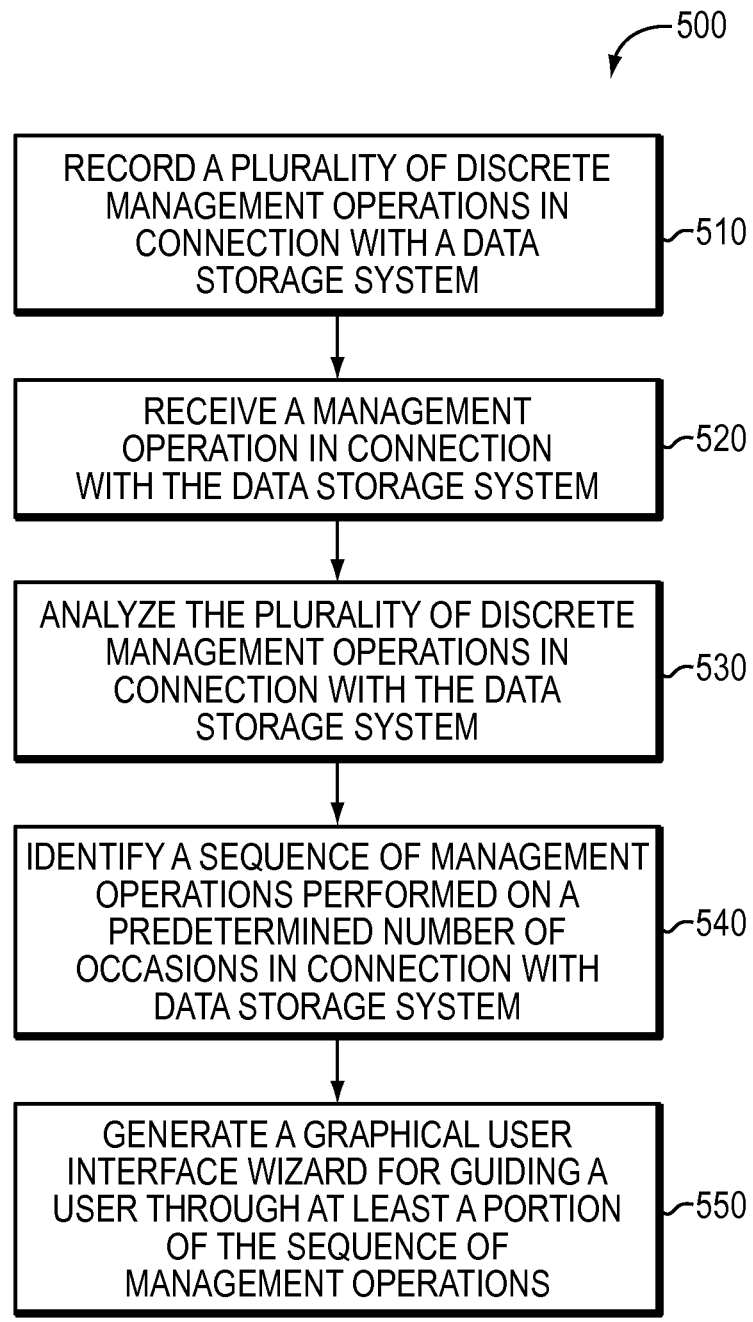
FIG. 5 is a flowchart of processing steps that may be performed in connection with the technique described herein.

Referring to FIG. 5, there is illustrated a technique 500 for use in managing data storage. It will be appreciated the technique is suitable for use in system 10 as disclosed above.

The technique comprises recording 510 a plurality of discrete management operations in connection with a data storage system 12. For example, the management operations may be recorded in a log in the data storage system. It will be appreciated that the operations may be recorded over a period of time.

The technique comprises receiving 520 a management operation in connection with the data storage system 12. For example, the management operation can relate to the creation of a LUN as discussed above.

The technique comprises analyzing 530 the plurality of discrete management operations in connection with the data storage system 12. It will be appreciated from the foregoing that the plurality of management operations can be recorded in the log. The technique as disclosed herein can analyze the plurality of management operations in the log. For example, the technique can analyze 530 the management operations in the log in response to receiving 520 the management operation such as the operation relating to the creation of the LUN.

The technique comprises identifying 540 a sequence of management operations performed on a predetermined number of occasions in connection with the data storage system based on the analysis. It will be understood that the received management operation will be one of the management operations in the sequence. It will be also understood that the technique may identify a sequence of events performed a number of times in which the received management operation is part of the sequence. For example, the technique may identify that the user created a LUN and simply added the new LUN to an already existing storage group. In another example, the technique may identify that the user created a new LUN and subsequently created a storage group and subsequently added the LUN to the storage group.

The technique comprises generating 550 a graphical user interface wizard such that a user can be guided through at least a portion of the sequence of discrete management operations in response to identifying the sequence. As discussed above, it will be appreciated that the technique may receive a management operation for creating a LUN. It will also be appreciated that the technique may in turn analyze the plurality of discrete management operations and identify a sequence of creating a LUN and adding the LUN to a storage group. The technique as disclosed herein can generate a graphical user interface wizard for guiding the user through the steps. The wizard may also have the characteristics of previous management operations in the sequence as defaults in the wizard. For example, the wizard may have the same storage capacity as was inputted when creating a LUN in previous sequence. As also discussed above, in another example, the sequence of management operations may be the creation of a LUN, the creation of a storage group and the addition of the LUN to the storage group. The technique may generate a graphical user interface for guiding the use through this sequence of steps or a portion of the sequence. For example, it will be appreciated that the user may want to skip the step of creating storage group as the use user may wish to use a storage group already created. The wizard in such a scenario can enable the user to skip the management operation of creating the storage group and select an already created storage group.

It will be understood that in one embodiment the generated graphical user interface wizard is provided to the user for guiding the user through at least a portion of the sequence of management operations. For example, the graphical user interface wizard may be provided automatically in response to receiving the management operation.

In another embodiment, an offer may be provided to the user of a graphical user interface wizard for guiding the user through at least a portion of the sequence of management operations in response to identifying the sequence. The generated graphical user interface wizard can be provided to the user in response to acceptance of the offer by the user. It will be appreciated that the user may not in certain scenarios want to proceed with the wizard as the user may not intend to perform the sequence, or a portion thereof, of management operations.

It will be understood that in another embodiment the received management operation is recorded with the plurality of recorded management operations in the log in the data storage system for enabling future analysis of management operations. It will be appreciated that if the user performs a sequence of management operations for the first time this sequence may be recorded enabling the identification of the sequence in the future.

It will be further understood in some embodiments that the sequence of management operations is identified in response to the sequence having been performed at least twice in connection with the data storage system. For example, if the sequence has been performed twice in the last week then on receipt of the first step of the sequence on the third occasion the technique as described herein analyzes the plurality of management operations and identifies the prior sequences. The technique can provide the graphical user interface wizard in response to identification of the sequence. The wizard can guide the user through at least a portion of the sequence without the user having to perform each step separately. It will be appreciated that in some embodiments the sequence of management operations is identified in response to the sequence having been performed at least twice over a predetermined period of time in connection with the data storage system. For example, if the sequence is performed twice in the last week. If the user has not perform the sequence twice in the last week then a graphical user interface wizard is not generated.

Figure 6:
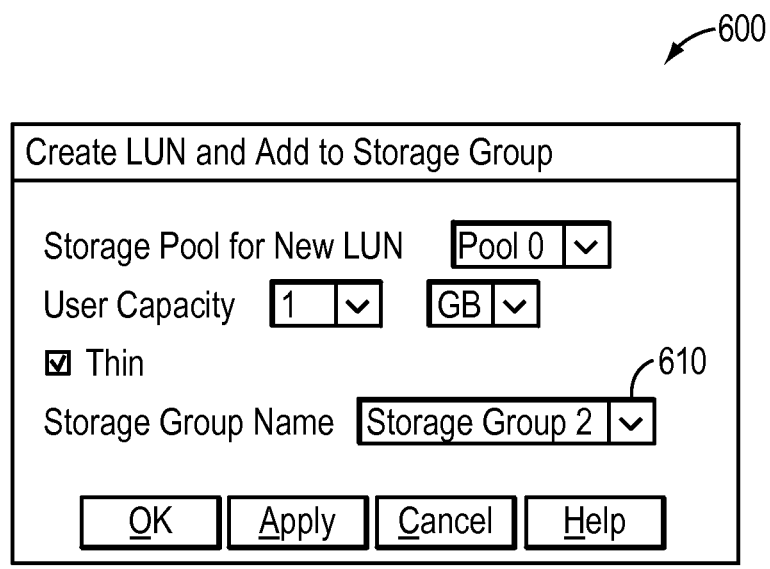
FIG. 6 is an example illustrating a graphical user interface wizard in connection with the technique described herein.

Referring to FIG. 6, there is illustrated a graphical user interface wizard 600 provided to the user for guiding the user through at least a portion of a sequence of management operations in response to identifying the sequence. It will be appreciated that in this embodiment the management operations as performed with respect to FIGS. 2 to 4 were recorded in the log in the data storage system. It will also be appreciated that in this embodiment the user initiates a management operation for the creation of a LUN. It will be further appreciated that the technique as disclosed herein can analyze the log and identify the previous sequence of management operation events in which the creation of a LUN was part of the sequence. The technique comprises generating and providing the graphical user interface wizard 600 for guiding the user through at least a portion of the sequence of management operations in response to identifying the sequence. In this embodiment, the management operation relating to the creation of a storage group is excluded. However, it will be appreciated that that user may press the combo box 610 adjacent the storage group name in order to select the option of creation of a new storage group. It will also be appreciated that the characteristics of the LUN as created in FIG. 2 are included as default characteristics for the new LUN. The storage group as created in FIG. 3 is the storage group into which the new LUN will be added. However, it should be noted that although in this embodiment the technique is only performing a portion of the sequence of management operations as performed in FIGS. 2 to 4, it is possible as previously discussed to perform all the management operations including the creation of a new storage group such that the user can be guided through the sequence of management operations as performed in FIGS. 2 to 4.

While the invention has been disclosed in connection with preferred embodiments shown and described in detail, their modifications and improvements thereon will become readily apparent to those skilled in the art. For example, the technique described herein may be applied to any computer system. Accordingly, the spirit and scope of the present invention should be limited only by the following claims.

What is claimed is:

1. A method for use in managing data storage, the method comprising:

recording a plurality of prior discrete management operations performed by a user in connection with storage at a data storage system, wherein at least one of the plurality of prior discrete management operations relates to the creation of a storage resource at the data storage system and includes a storage capacity requirement and a thin provisioning requirement of the storage resource;

receiving a management operation in connection with storage at the data storage system, wherein the management operation relates to the creation of a storage resource;

analyzing the plurality of prior discrete management operations to identify a sequence of management operations;

in response to identifying the sequence of management operations, determining whether the sequence of management operations is performed a predetermined number of occasions over a period of time in connection with the data storage system, wherein the received management operation is one of the management operations in the sequence;

providing an offer of a graphical user interface wizard to guide the user through the identified sequence in response to a positive determination;

in response to acceptance of the offer, and based on the identified sequence, providing a graphical user interface wizard to guide the user through the identified sequence of discrete management operations, wherein providing the graphical user interface wizard includes inserting the storage capacity requirement and the thin provisioning requirement as defaults in the wizard, further wherein providing the graphical user interface wizard includes auto-assigning a name to the storage resource, further wherein providing the graphical user interface wizard includes inserting an ability to edit one or more of the defaults and an ability to skip at least one of the management operations in the sequence by selecting an existing resource previously created by a management operation in the sequence; and updating the recording of the plurality of prior discrete management operations to include the management operations in the wizard such that the updating enables an analysis to determine a number of times that the sequence has been performed over a period of time.

2. The method as claimed in claim 1, further comprising: recording the received management operation with the plurality of recorded management operations in a log in the data storage system for enabling future analysis of management operations.

3. The method as claimed in claim 1, wherein the sequence of management operations is identified in response to the sequence having been performed at least twice in connection with the data storage system.

4. The method as claimed in claim 3, wherein the sequence of management operations is identified in response to the sequence having been performed at least twice over a predetermined period of time in connection with the data storage system.

5. The method as claimed in claim 1, wherein the sequence of management operations comprises at least the management operation relating to the creation of a storage group.

6. The method as claimed in claim 1, wherein the sequence of management operations comprises at least the management operation relating to the addition of a LUN to a storage group.

7. A system for use in managing data storage, the system comprising:
memory; and
processing circuitry coupled to the memory, the memory storing program code which, when executed by the processing circuitry, cause the processing circuitry to:
record a plurality of prior discrete management operations performed by a user in connection with storage at a data storage system, wherein at least one of the plurality of prior discrete management operations relates to the creation of a storage resource at the data storage system and includes a storage capacity requirement and a thin provisioning requirement of the storage resource;

receive a management operation in connection with storage at the data storage system, wherein the management operation relates to the creation of a storage resource;

analyze the plurality of prior discrete management operations to identify a sequence of management operations;

in response to identifying the sequence of management operations, determining whether the sequence of management operations is performed a predetermined number of occasions over a period of time in connection with the data storage system, wherein the received management operation is one of the management operations in the sequence;

providing an offer of a graphical user interface wizard to guide the user through the identified sequence in response to a positive determination;

in response to acceptance of the offer, and based on the identified sequence, provide a graphical user interface wizard to guide the user through the identified sequence of discrete management operations, wherein providing the graphical user interface wizard includes inserting the storage capacity requirement and the thin provisioning requirement as defaults in the wizard, further wherein providing the graphical user interface wizard includes auto-assigning a name to the storage resource, further wherein providing the graphical user interface wizard includes inserting an ability to edit one or more of the defaults and an ability to skip at least one of the management operations in the sequence by selecting an existing resource previously created by a management operation in the sequence; and update the recording of the plurality of prior discrete management operations to include the management operations in the wizard such that the updating enables an analysis to determine a number of times that the sequence has been performed over a period of time.

8. The system as claimed in claim 7, further wherein the processing circuitry is caused to:
record the received management operation with the plurality of recorded management operations in a log in the data storage system for enabling future analysis of management operations.

9. The system as claimed in claim 7, wherein the sequence of management operations is identified in response to the sequence having been performed at least twice in connection with the data storage system.

10. The system as claimed in claim 9, wherein the sequence of management operations is identified in response to the sequence having been performed at least twice over a predetermined period of time in connection with the data storage system.

11. The system as claimed in claim 7, wherein the sequence of management operations comprises at least the management operation relating to the creation of a storage group.

12. The system as claimed in claim 7, wherein the sequence of management operations comprises at least the management operation relating to the addition of a LUN to a storage group.

* * * * *